(12) United States Patent
Herko et al.

(10) Patent No.: US 8,906,190 B2
(45) Date of Patent: Dec. 9, 2014

(54) INTERMEDIATE TRANSFER BELT STEERING RIB APPLICATOR DEVICE AND METHOD

(71) Applicant: XEROX Corporation, Norwalk, CT (US)

(72) Inventors: Jonathan H. Herko, Walworth, NY (US); David W. Martin, Walworth, NY (US); Scott J. Griffin, Fairport, NY (US); Michael S. Roetker, Webster, NY (US); Dante M. Pietrantoni, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 13/781,687

(22) Filed: Feb. 28, 2013

(65) Prior Publication Data

US 2013/0174957 A1  Jul. 11, 2013

Related U.S. Application Data

(62) Division of application No. 12/630,437, filed on Dec. 3, 2009, now abandoned.

(51) Int. Cl.
*B29C 65/48* (2006.01)
*B25B 11/02* (2006.01)
*G03G 15/16* (2006.01)
*B25B 11/00* (2006.01)
*B29C 65/78* (2006.01)
*B29C 65/00* (2006.01)

(52) U.S. Cl.
CPC .......... *G03G 15/1605* (2013.01); *B25B 11/005* (2013.01); *B29C 65/7838* (2013.01); *B29C 65/7847* (2013.01); *B29C 66/53241* (2013.01); *B29C 66/5344* (2013.01); *B29C 66/61* (2013.01); *B29C 66/632* (2013.01); *G03G 15/161* (2013.01); *G03G 15/162* (2013.01); *G03G 2215/00143* (2013.01); *G03G 2215/00151* (2013.01)
USPC ........... 156/285; 156/293; 156/423; 156/494; 269/21; 399/302

(58) Field of Classification Search
CPC .............. B25B 11/005; B29C 65/7838; B29C 65/7847; B29C 66/53241; B29C 66/5344; B29C 66/61; B29C 66/612; B29C 66/632; G03G 15/1605; G03G 15/161; G03G 15/1615; G03G 15/162; G03G 2215/00143; G03G 2215/00151
USPC ......... 156/156, 285, 293, 294, 423, 494, 539, 156/581; 269/21, 52; 29/522.1, 523, 281.5; 399/302
See application file for complete search history.

(56) References Cited

U.S. PATENT DOCUMENTS 4,005,653 A * 2/1977 Arkell ......................... 101/389.1
5,143,573 A * 9/1992 Ammon et al. ................ 156/294
(Continued)

FOREIGN PATENT DOCUMENTS

EP       0784537 B1 * 5/1998

*Primary Examiner* — Michael Tolin
(74) *Attorney, Agent, or Firm* — Ronald E. Prass, Jr.; Prass LLP

(57) ABSTRACT

A system and apparatus are provided for adhering steering ribs to an intermediate transfer belt (ITB). These steering ribs (one or more) are applied to the ITB by placing the rib material around a cylindrical fixture. The rib material is held in place by a vacuum that is applied to the rib material to hold it against the fixture. An ITB may be separately held in place on the fixture by another vacuum until the rib material is adhered to the inside surface of the ITB through application of compressed air to force the rib material outward against the ITB. Once the rib material is adhered to the ITB, a series of apertures directs compressed air against the rib and the ITB to release them from the fixture.

13 Claims, 5 Drawing Sheets

(56) References Cited

U.S. PATENT DOCUMENTS

| | | |
|---|---|---|
| 6,871,038 B2 | 3/2005 | Fujiwara |
| 7,957,685 B2 * | 6/2011 | Shimizu .................. 399/308 |
| 2007/0280747 A1 * | 12/2007 | Kawatani et al. ............ 399/302 |
| 2009/0084498 A1 | 4/2009 | Shimizu |

* cited by examiner

INTERMEDIATE TRANSFER BELT STEERING RIB APPLICATOR DEVICE AND METHOD

This is a divisional application of U.S. patent application Ser. No. 12/630,437, filed Dec. 3, 2009 (published as U.S. Patent Application Publication No. 2011-0135348 A1 on Jun. 9, 2011), now abandoned, the disclosure of which is hereby incorporated by reference herein in its entirety.

BACKGROUND

1. Field of Invention

This invention relates to system and a method for applying a steering rib to an intermediate transfer belt (ITB) for use in an electrophotographic color system.

2. Related Art

In one electrophotographic color system, an array or series of different color imaging stations are aligned above an endless intermediate transfer belt (ITB). Each imaging station contains a raster output scanner (ROS), photoreceptor drum, development station, and cleaning station. The ROS emits an electronic beam (laser), which impinges on the rotating photoconductive drum, thereby causing that location on the drum to undergo a change in electrical charge. As the drum continues to rotate past the development station, toner particles of a color which is unique to that imaging station will attach to the drum at the location charged by the ROS. This colored image is then transferred from the drum to an ITB that is passing by, and in contact with, that photoreceptor drum. As the ITB passes by the different imaging stations (each usually containing a different color), it picks up subsequent color layers from the drums to create a complete color image which is then transferred to media.

Systems using ITB architectures in the lower cost markets have identified passive belt tracking as a low cost alternative to active steering. Actively steered systems require a closed-loop control system consisting of multiple sensors, motors, and various other hardware and software components. Passively steered systems work on mechanics alone. One method for passive steering is through the use of belt steering or guide ribs. These ribs are adhered to the belt's surface and provide a mating surface with notched rollers, or the like, within the belt module. This interface keeps the ITB aligned as it rotates, preventing lateral movement, and in turn, ensuring proper image-on-image and image-on-paper registration.

SUMMARY OF DISCLOSED EMBODIMENTS

This disclosure provides a method and device for aiding in the application of one or more steering ribs to the inside circumference of an ITB. The device consists of a drum or cylinder onto which the self-adhesive ribbing material placed and held via vacuum. The ITB is then slid over the cylinder or drum and located with respect to the ribbing. At this point, the vacuum is removed and a puff of air is applied, transferring the ribbing material to the ITB. The process would be repeated to apply a rib on the other end or other ITB location, if desired. This cylindrical apparatus with vacuum and air apertures greatly simplifies application of the steering rib and improves quality and uniformity of application.

The sequence of operation of the method is as follows: (1) Vacuum is applied to the lower plenum of the cylindrical fixture; (2) A precut strip of pressure sensitive adhesive coated urethane steering rib is placed over the lower plenum; (3) Once in place, scrim paper can be removed from the outside surface of the ribs, exposing the adhesive on the outside surface of the steering rib; (4) Compressed air is applied to the upper plenum and the ITB is placed around the cylindrical fixture and slid down until it engages completely with the base; (5) Vacuum is applied to the upper plenum, securing the belt in place; (6) Vacuum is removed from the lower plenum and compressed air is applied, forcing the outside surface of the ribbing against the inner circumference of the belt; (7) The belt is then removed. The process can be repeated to apply ribbing to the opposite end of the belt, as necessary or appropriate.

While polyurethane ribs are a preferred material, any suitable material can be used for the steering rib such as other plastics, papers, tapes, and the like. Also, external connections to a source of vacuum and compressed air are located in the ribbing application fixture, or sources of compressed air can be located within the fixture, if more convenient.

DETAILED DESCRIPTION OF EMBODIMENTS

Figure 1:
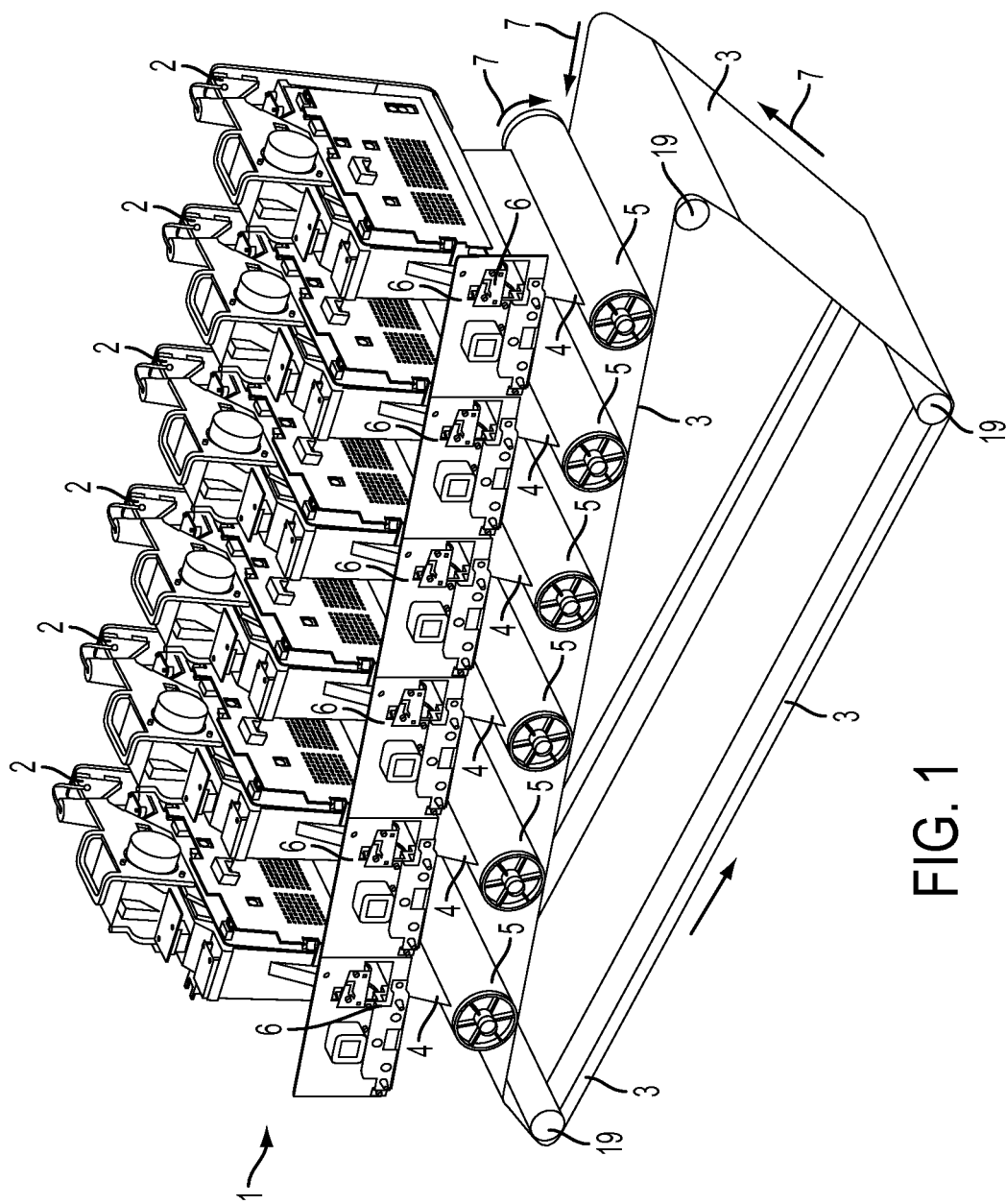
FIG. 1 illustrates a color imaging system using an embodiment of an ITB according to this disclosure.
Figure 2:
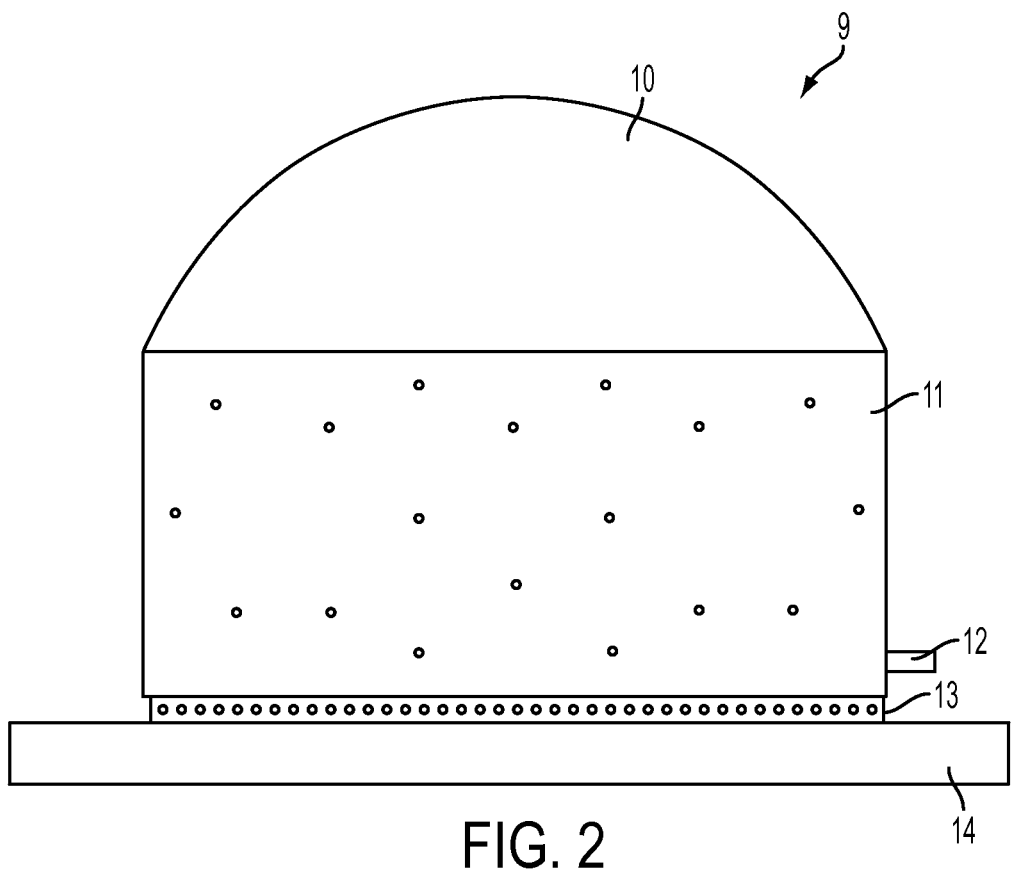
FIG. 2 illustrates a domed ribbing application fixture with an external connection to vacuum and compressed air according to this disclosure.

In FIG. 1, a color imaging system 1 is illustrated having an array of raster output scanners (ROS) 2 and their associated photoconductive drums 5 aligned above an endless ITB 3. Each ROS emits a different image beam 4 onto a photoconductive drum 5 to charge the surface of the photoconductive drum 5 where the image for that color will be located. As the photoconductive drum 5 rotates, the charged regions pick up toner of the color for that particular imaging station and transfer this color image to the surface of the ITB 3 so that each colored image is deposited in relation to the previous deposited image. At the end of the process, all deposited images (that are color developed at each station) are precisely aligned to form the final color image, which is eventually transferred to media. The arrows 7 indicate the rotation direction of the photoconductive drum 5 and ITB 3. The steering ribs 8, applied according to the systems and methods of this disclosure are shown on the inside surface of the ITB 3.

Rollers 19 of FIG. 1 mate with steering ribs 8 to move the ITB 3 precisely around the structure of system 1. Rollers 19 can have an abrasive surface or projections that mate with the steering ribs 8 to ensure there is no slippage in the ITB 3. Precise movement of the ITB 3 assures good image-to-image alignment.

This type of color system, having an array of ROS units, is generally described in U.S. Pat. No. 6,418,286, the disclosure of which is incorporated by reference herein in its entirety.

A cylindrical fixture 9 according to this disclosure may include the following parts. A domed upper portion, dome 10, of the cylindrical fixture 9 may allow for quick and easy alignment of the ITB 3 (shown in FIG. 4) around the cylindrical fixture 9. Below the dome 10 is an air plenum, upper plenum 11, which may provide a constant cushion of air between the cylindrical fixture 9 and the ITB 3 during the loading and unloading process. The air and vacuum may be provided by external air and vacuum intake 12. Beneath the upper plenum 11 may be a vacuum channel, lower plenum 13, into which the ribbing material for the steering ribs 8 may be located. The lower plenum 13 is configured to help to locate the ribbing material for the steering ribs 8 while a vacuum in the lower plenum 13 holds ribbing material for the steering ribs 8 in place. During the application process, this chamber, lower plenum 13 may be subsequently pressurized in order to force ribbing material for the steering ribs 8 along the internal circumference of the ITB 3. Finally, the base 14 may provide a hard stop to which the ITB 3 and edges of the ribbing material for the steering ribs 8 are aligned. The term "cylindrical" fixture includes round and oval cylinders or any other fixtures having round surfaces.

Figure 3:
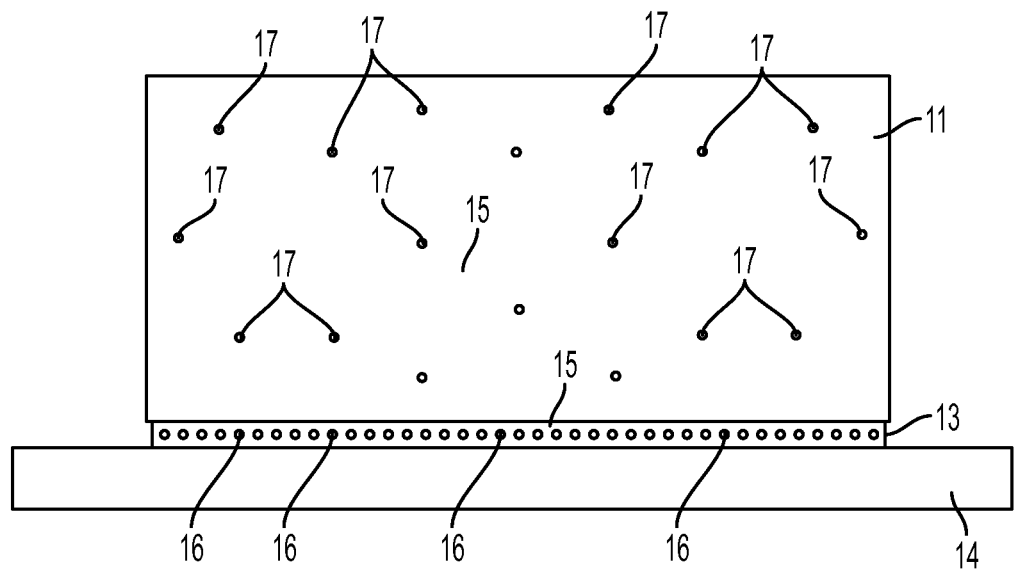
FIG. 3 illustrates a ribbing application fixture without a dome and with an internal source of vacuum and compressed air according to this disclosure.

FIG. 3 illustrates an embodiment of a cylindrical (application) fixture 9 without a dome 10 and without an external air and vacuum intake 12. In this embodiment, any suitable vacuum generating and compressed air means 15 may be located within the upper plenum 11 and the lower plenum 13 having vacuum outlets 16 and compressed air outlets 17.

Figure 4:
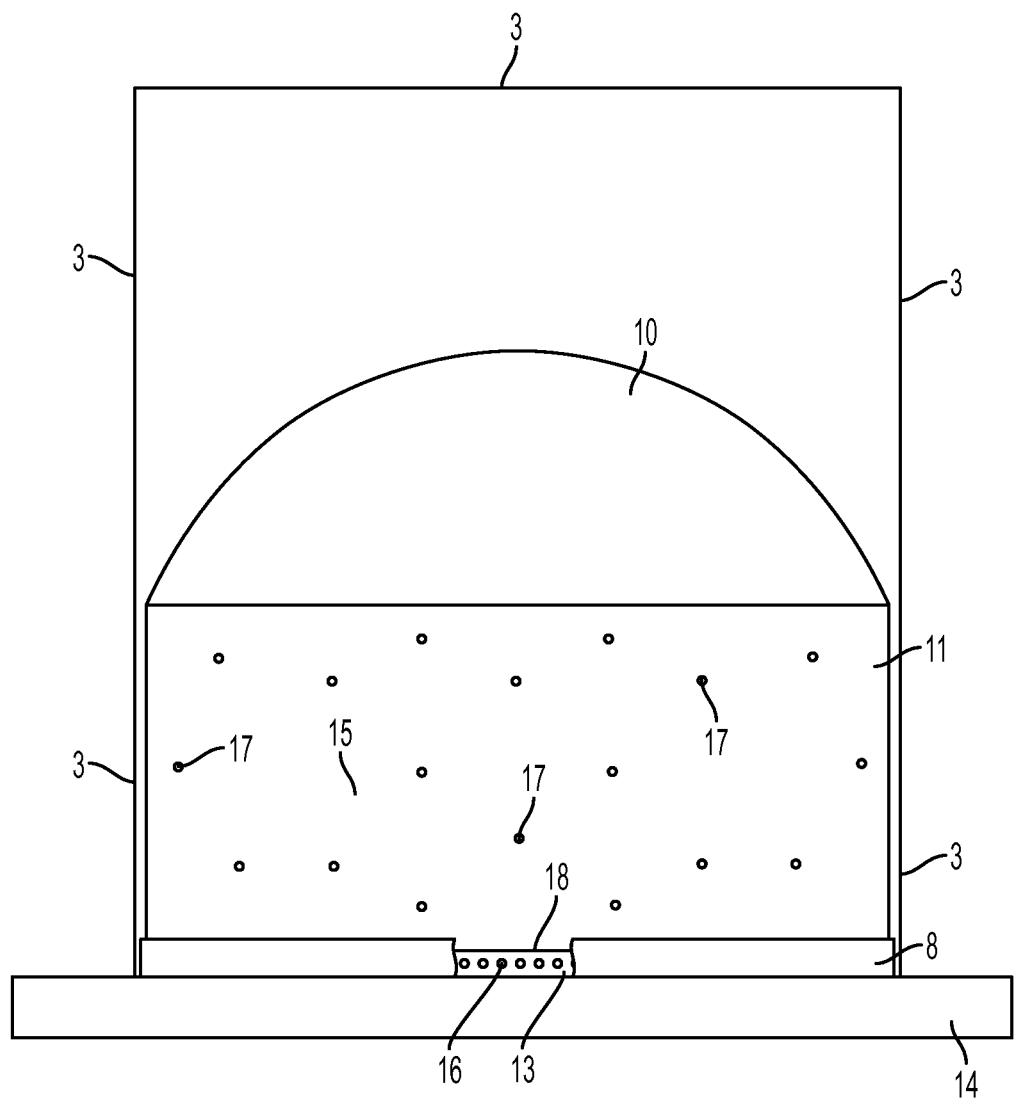
FIG. 4 illustrates an embodiment of a ribbing application fixture according to this disclosure with an ITB positioned on fixture ready for the ribbing material to be applied.
Figure 5:
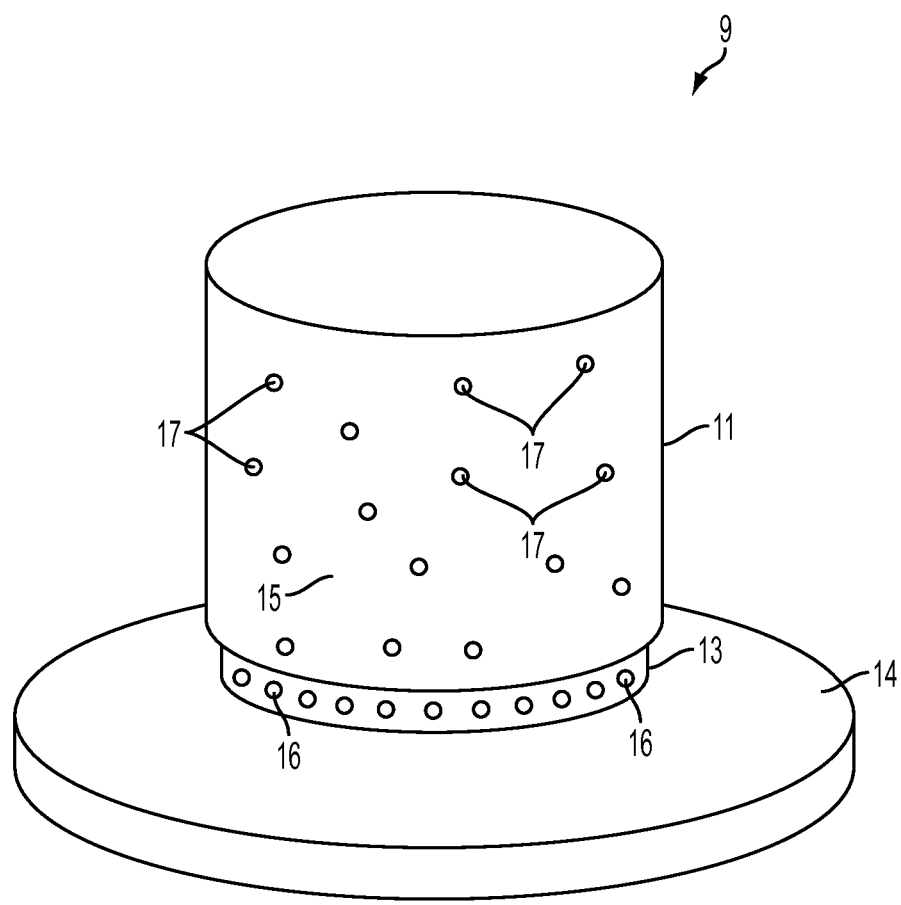
FIG. 5 is a perspective view of the ribbing application fixture of FIG. 4.

In FIG. 4 for clarity dotted lines are not shown or used. Rather, the cylindrical fixture 9 is shown in solid lines. FIG. 5 is a perspective view of an embodiment of the cylindrical fixture 9 described in this disclosure. The sequence of the operation of the application of the steering ribs 8 is as follows. (1) Vacuum may be applied to the lower plenum 13. (2) A precut strip of pressure sensitive adhesive coated urethane, as a material for the steering ribs 8 (or other suitable material such as plastic tapes) is placed into a channel in the lower plenum 13. (3) Once in place, any scrim paper covering the adhesive on the material for the steering ribs 8 may be removed from the external (exposed) surface of material for the steering ribs 8 exposing the adhesive on the outer surface of the material for the steering ribs 8. (4) Compressed air may be applied to the upper plenum 11 and the ITB 3 may be placed around the cylindrical fixture 9 and slid down until the ITB 3 engages completely with the base 14. (5) Vacuum may be applied to the upper plenum 11 securing the ITB 3 in place. (6) Vacuum may be removed from the lower plenum 13 and compressed air may be applied, forcing the material for the steering ribs 8 against the inner circumference 18 of the ITB 3. (7) The ITB 3 may then be removed while applying compressed air to the upper plenum 11. The process can be repeated to apply ribbing to the opposite end of the ITB 3, as necessary. A portion of the steering ribs 8 may be cut away to show the location of lower plenum 13 and vacuum outlet aperture 16. The steering ribs 8 can be placed on both ends of the ITB 3 or on only one end or at any location on the inner surface 18 of the ITB 3.

In summary, the disclosed embodiments provide a novel method of applying a steering rib to an ITB for use in an electrophotographic marking system, and a novel rib application fixture.

The electrophotographic marking system comprises an ITB. Thus the ITB has on its inner surface at least one steering rib, which is configured to guide and steer the ITB during a marking step. The rib or ribs are configured to mate with an aligned abraded or notched roller or surface to keep the belt aligned as it rotates, thus ensures minimum lateral movement during image-on-image registration. These ribs are provided on the ITB by placing the ribs with an adhesive on an outer surface around and on the circumference of a cylindrical fixture and positioning the ITB on the cylindrical fixture over the ribbing and thereby adhering the ribs to an inside surface of the ITB. The steering rib has an adhesive on its external side to facilitate attachment to the inner surface of the ITB. The steering rib may be composed of a material selected from the group consisting of plastics, paper, and fiberglass with an adhesive on its outer surface. The steering rib, in a preferred embodiment, may comprise a polyurethane material. The steering rib may located on two edge portions of the ITB. The steering rib in one embodiment may be located on one edge portion of the ITB.

This disclosed embodiments also provide a method of applying a steering rib to an ITB of an electrophotographic marking system. This method comprises providing a cylindrical ribbing application fixture, providing in the fixture a base structure, above the base structure a lower plenum may be provided, and above the lower plenum, an upper plenum may be provided. A vacuum may be applied to the lower plenum to thereby hold in place a precut strip of the ribbing material that is positioned around the lower plenum. An outer surface of the ribbing material configured a steering rib may be exposed to an inner surface of the ITB, with an adhesive located on the outer surface of the ribbing material. The vacuum may be removed from the lower plenum and compressed air may be applied to release the ribbing from the fixture. The steering ribs with the adhesive exposed may be forced against an inner circumference of the ITB. When complete, the ITB with the ribbing may be removed from the cylindrical application fixture.

In one embodiment, the vacuum may be applied to the lower plenum via apertures in the lower plenum. The compressed air may be applied to the upper plenum via apertures in the upper plenum. The vacuum and the compressed air may be supplied to the fixture from a source external to the fixture. In another embodiment, the vacuum and the compressed air may be supplied to the fixture from a source internal to the fixture. The ribbing in one embodiment may be applied as a steering rib to one inner side of the ITB. In another embodiment, the ribbing may be applied to as a plurality of steering ribs to two or more inner locations on the ITB. The ribbing material in a preferred embodiment comprises a polyurethane material. The lower plenum and the upper plenum may comprise a cylindrical or drum-like structure having a dome in one embodiment positioned above the upper plenum for easy sliding of an ITB over the dome and around the drum. In a second embodiment, the dome may not be used on the fixture.

A cylindrical ribbing application fixture for may be provided for applying ribbing to an ITB, the fixture comprising a base structure. Above the base structure is positioned a cylindrical lower plenum; positioned above the lower plenum, and contiguous therewith, is a cylindrical upper plenum. The lower plenum has a plurality of vacuum apertures around its circumference. These apertures are configured to apply a vacuum to the ribbing to hold the ribbing in place around the lower plenum before the ribbing is adhered to the ITB. The upper plenum has a plurality of air apertures around its circumference, which are configured to apply compressed air against an inner surface of the ITB to thereby release the ITB from the fixture after the ribbing is adhered to the ITB.

In one embodiment, the vacuum and the compressed air are supplied to the fixture from a source outside the fixture. In another embodiment, the vacuum and the compressed air are supplied to the fixture from a source internal to the fixture. The lower plenum is configured to receive the ribbing around its circumference. The apertures in the lower plenum are configured to supply a vacuum that holds the ribbing against the lower plenum prior to the ribbing being adhered to the ITB.

It will be appreciated that variations of the above-disclosed and other features and functions, or alternatives thereof, may be desirably combined into many other different systems or applications. Also, various presently unforeseen or unanticipated alternatives, modifications, variations or improvements may be subsequently made by those skilled in the art, which are also intended to be encompassed by the following claims.

What is claimed is:

1. A method of applying at least one steering rib to an intermediate transfer belt of an electrophotographic marking system, comprising:
   providing a cylindrical ribbing application fixture including:
      a base structure,
      above the base structure, a recessed portion including a lower plenum, and
      above the recessed portion including the lower plenum, a non-recessed portion including an upper plenum,
   applying a vacuum to the lower plenum to hold a precut strip of the at least one steering rib that is positioned around the lower plenum,
   exposing to an inner surface of the belt, an outer surface of the at least one steering rib, an adhesive being located on the outer surface of the at least one steering rib,
   applying compressed air to the upper plenum while positioning the belt around the cylindrical ribbing application fixture,
   applying vacuum to the upper plenum, securing the belt in place,
   applying compressed air to the lower plenum forcing the at least one steering rib with the adhesive against the inner surface of the belt,
   removing the vacuum from the upper plenum,
   reapplying compressed air to the upper plenum, and
   removing the belt with the at least one steering rib affixed thereto from the cylindrical ribbing application fixture,
   a vacuum generating device connected to the upper and lower plenums, and
   a compressed air device connected to the upper and lower plenums.

2. The method of claim 1, the vacuum and the compressed air being applied to the lower plenum via apertures in the lower plenum.

3. The method of claim 1, the vacuum and the compressed air being applied to the upper plenum via apertures in the upper plenum.

4. The method of claim 1, the vacuum and the compressed air being applied to the cylindrical ribbing application fixture from a source external to the cylindrical ribbing application fixture.

5. The method of claim 1, the vacuum and the compressed air being applied to the cylindrical ribbing application fixture from a source internal to the cylindrical ribbing application fixture.

6. The method of claim 1, the at least one steering rib being applied on one inner side of the belt.

7. The method of claim 1, the at least one steering rib being applied to two or more locations on an inner side of the belt.

8. The method of claim 1, the at least one steering rib being formed of a polyurethane material.

9. The method of claim 1, the cylindrical ribbing application fixture comprising a cylindrical or drum-like structure having a dome positioned above for facilitating sliding of the belt over the dome and around the cylindrical ribbing application fixture.

10. A cylindrical ribbing application fixture for applying at least one steering rib to an intermediate transfer belt, comprising:
    a base structure,
    a cylindrical lower plenum positioned above the base structure,
    a cylindrical upper plenum positioned above, and contiguous with, the lower plenum,
    the lower plenum having a plurality of apertures around a circumference of the lower plenum, the apertures being configured to apply a vacuum to the at least one steering rib to hold the at least one steering rib in place around the lower plenum and the apertures being configured to apply compressed air to the at least one steering rib to apply the at least one steering rib to the belt,
    the upper plenum having a plurality of apertures around a circumference, the apertures being configured to apply compressed air against an inner surface of an intermediate transfer belt to facilitate loading and release of the intermediate transfer belt from the cylindrical ribbing application fixture after the at least one steering rib is applied to the intermediate transfer belt and the apertures being configured to apply vacuum to the intermediate transfer belt to secure the intermediate transfer belt in place during a steering rib application process.

11. The fixture of claim 10, the vacuum and the compressed air being supplied to the fixture from a source outside the fixture.

12. The fixture of claim 10, the vacuum and the compressed air being supplied to the fixture from a source internal to the fixture.

13. The fixture of claim 10, the lower plenum being configured to receive the at least one steering rib in a recess around the lower plenum, the plurality of apertures in the lower plenum being configured to apply the vacuum that holds the at least one steering rib against the lower plenum.

* * * * *